3,484,519
Patented Dec. 16, 1969

3,484,519
ANTHELMINTIC 2-SUBSTITUTED BENZIMIDAZOLE-METAL ARSENATE COMPOSITIONS AND METHOD
Ashton C. Cuckler, Westfield, John R. Egerton, Neshanic Station, and Alexander Zeissig, Mountainside, N.J., assignors to Merck & Co., Inc., Rahway, N.J., a corporation of New Jersey
No Drawing. Continuation-in-part of application Ser. No. 422,574, Dec. 31, 1964. This application Dec. 2, 1965, Ser. No. 511,233
Int. Cl. A01n 13/00, 9/22; A61k 27/00
U.S. Cl. 424—134                                    2 Claims

ABSTRACT OF THE DISCLOSURE

Synergistic compositions containing as the essential active ingredients a 2-substituted benzimidazole and a metal arsenate are employed in the treatment and control of helminthiasis.

---

This application is a continuation-in-part of U.S. application Ser. No. 422,574, filed Dec. 31, 1964 now abandoned.

This invention relates to compositions useful in the treatment of parasitic diseases in animals. More particularly, the invention relates to synergistic compositions containing certain 2-substituted benzimidazoles and metal arsenates, and compositions which have a wide spectrum of activity. Furthermore, it relates to methods for using certain 2-substituted benzimidazoles and metal arsenates in the treatment and control of helminthiasis.

Helminthiasis is a disease affecting man and animals and is manifested by the infection of the host with parasites known as helminths. It is a very widespread disease, particularly in ruminants such as sheep, cattle, goats, and equines such as horses and mules. A wide variety of helminths are known and give rise to different, but in some cases related, infections. Different anthelmintics are therefore employed to combat the infection, depending on the nature of the helminth. Thus, in general, helminthiasis due to Cestoda (tapeworm) and Trematoda (flukes) are treated with different anthelmintics from those used to treat heliminthiasis due to Nematoda (roundworm). Typical of the tapeworms found in sheep and cattle, for example, are those represented by the general Moniezia and Thysanosoma. Tapeworms in horses are commonly of the genera Anoplocephala and Paranoplecephola. Roundworm in sheep and cattle are commonly of the genera Strongyloides, Oesophagostomum, Bunostomum, Haemonchus, Ostertagia, Trichostrongylus, Cooperia, Nematodirus, and Chabertia. Similarly, the nematode genera commonly afflicting horses are Strongylus, Strongyloides, Cylicocercus, Cyathostomum, Cylicobrachytus, Parascaris and Oxyuris.

Heretofore, general anthelmintic treatment has revolved around treating the diseased animals with specific anthelmintic agents having selective anthelmintic properties. It would be very desirable indeed to provide the art with an anthelmintic composition having a wide spectrum of activity capable of ridding the host animal of both tapeworms and roundworms simultaneously. The arsenates have been known to possess anthelmintic activity of varying degrees of efficacy, but unfortunately are very toxic substances. Where toxic substances are involved, therefore, it would be even more desirable to provide an anthelmintic composition which performs these functions efficaciously and synergistically thereby reducing the amount of toxic substances ingested with the composition compared to the amount that would be required to reach the same degree of efficacy if that compound were administered alone.

It is an object of this invention to provide anthelmintic compositions having a wide spectrum of activity. It is a further object to provide an anthelmintic composition comprising certain 2-substituted benzimidazoles and a metal arsenate in which said benzimidazoles and arsenates have synergistic activity when administered. It is a further object to provide methods for controlling helminthiasis in infected animals and animals susceptible to helminthiasis. These and other objects will be apparent from the detailed disclosure appearing below.

According to the present invention, it has been surprisingly discovered that a highly effective anthelmintic composition having the properties above referred to is obtained from a composition containing certain 2-substituted benzimidazoles and metal arsenates. The 2-substituted benzimidazoles contemplated for use in the composition have the following structural formula:

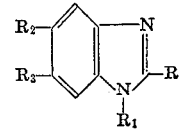

where R is thiazolyl, isothiazolyl, thiadiazolyl, pyrryl, furyl, thienyl, or phenyl, $R_1$ is hydrogen, lower alkyl, or alkenyl, $R_2$ and $R_3$ are hydrogen, lower alkyl, lower alkoxy, or trifluoromethyl. Also contemplated for use are the acid addition salts of the foregoing compounds. Typical of the 2-substituted benzimidazoles which may be employed are 2-(4'-thiazolyl)benzimidazole, 2-(2'-thiazolyl)benzimidazole, 2-(4'-thiazolyl)-5-methyl benzimidazole, 2-(2'-thiazolyl)-5,6-dimethyl benzimidazole, 2-(4'-thiazolyl)-5-trifluoromethyl benzimidazole, 2-(3'-thienyl) benzimidazole, 2-phenyl benzimidazole, 1-methyl-2-phenyl benzimidazole, 2-phenyl-5,6-dimethyl benzimidazole, 2-phenyl-5-ethoxy benzimidazole, 2-(2'-thienyl)benzimidazole, 1-methyl-2-(2'-thienyl)benzimidazole, 1,5-dimethyl-2-(2'-thienyl)benzimidazole, 2-(2'-thienyl)-5,6-dimethyl benzimidazole, 2-(2'-thienyl)-5-methyl benzimidazole, 1-ethyl-2-(3'-thienyl)benzimidazole, 1-allyl-2-(3'-thienyl)benzimidazole, 2-(3'-thienyl)-5,6-dimethoxy benzimidazole, 2-(2'-furyl)benzimidazole, 2-(3'-furyl)benzimidazole, 1-methallyl-2-(3'-furyl)benzimidazole, 1-butyl-2-(2'-furyl)benzimidazole, 2-(2'-pyrryl)benzimidazole, 2-(3'-pyrryl)benzimidazole, 1-ethyl-2-(2'-pyrryl)benzimidazole, 1-allyl-2-(3'-pyrryl)benzimidazole, and 2-(2'-pyrryl)-5-ethoxy benzimidazole. Preferred among the foregoing for use in the compositions of the present invention and in the treatment of helminthic infections as hereinafter specified are 2-(4'-thiazolyl)benzimidazole, 2-(2'-thiazolyl)benzimidazole, 2-phenyl benzimidazole, 2-(3'-thienyl)benzimidazole, 2-(2'-thienyl)benzimidazole, 2-(2'-furyl)benzimidazole, and 2-(2'-pyrryl)benzimidazole, and most preferred is 2-(4'-thiazolyl)benzimidazole. Also acid addition salts of the foregoing compounds may be employed in the compositions. Such acid addition salts as are obtained from the hydrohalic acids, sulfuric acid, nitric acid, phosphoric acid, citric acid, acetic acid, propionic acid, oxalic acid, succinic acid, and the like may be used.

The metal arsenates used in the compositions of the present invention with the foregoing benzimidazole compounds are those exemplified by aluminum, calcium, cobalt, copper, tin, iron, zinc, and lead arsenates. Preferred among the foregoing are the copper, tin, lead, and iron arsenates and most preferred are iron and lead arsenates. Where the metal of the metal arsenate is available in various valence forms, such may be employed. Thus, the preferred compositions of the present invention comprise any of the above preferred anthelmintic ingredients, namely 2-(4'-thiazolyl)benzimidazole, 2-(2'-thiazolyl) benzimidazole, 2-phenyl benzimidazole, 2-(3'-thienyl) benzimidazole, 2-(2'-pyrryl)benzimidazole, 2-(2'-thienyl) benzimidazole, and 2-(2'-furyl)benzimidazole or mixtures of any of these with any of the foregoing preferred arsenates, namely copper, tin, lead, and iron arsenates or mixtures of any of these. Most preferred are the compositions comprising 2-(4'-thiazolyl)benzimidazole with the preferred arsenates and especially with iron arsenate and lead arsenate.

The amounts of each anthelmintic ingredient in the composition, as well as the remaining constituents of the composition, will vary according to the type of treatment to be employed, the host animal, and the particular parasitic disease being treated. In general, however, compositions containing a total weight percent of anthelmintic ingredients ranging from 0.001 to 95% will be suitable with the remainder being any suitable carrier or vehicle. Furthermore, the compositions should contain enough of the active anthelmintic ingredients to provide an effective dosage for the proper treatment of the parasitic disease. As stated above, and as will appear hereafter, the actual amounts will vary. Within the above-stated range, the relative amounts of benzimidazole compound to arsenate is not critical except to the extent that the composition contains enough of each to be pharmaceutically effective considered with the size of the host, the mode of treatment contemplated, and the presence of arsenate as being below a level which produces intolerable toxic effects. What will be intolerable will be determined by the user. In general, benzimidazole compound: arsenate compound weight ratios in the range of from 1:0.04 to 1:1.5 will be suitable. The actual ratio selected will depend upon the proportion of arsenic in the metal arsenate and the potency of the 2-substituted benzimidazole compound considered with the size and species of the host. Preferably, the weight ratios are from 1:0.1 to 1:1 based on a benzimidazole:arsenate ratio.

A number of modes of treatment may be employed, and each to some extent determines the general nature of the composition. For example, the anthelmintic compounds may be administered to domesticated animals in a single unit dosage form as a tablet, bolus, or drench; or they may be compounded as a feed premix to be later admixed with the animal's food. When single unit dosage forms are desired to be given, effective results are obtained when the benzimidazole is present in an amount sufficient to provide a dosage level of from 0.1–600 mg./kg. of animal body weight and the arsenate is present in an amount sufficient to provide from 0.1–1.5 grams per animal (for sheep and goats; neat cattle may require larger dosages because of their greater body weight). The ranges indicated are variable and cover the range for the compounds discussed herein, but the actual dosage level will vary according to the size and species of animal to be treated, and the activity of the compound. The preferred roundworm dosage level for ruminants and equines for the preferred benzimidazole compounds are as follows: 2-(4'-thiazolyl)benzimidazole and 2-(2'-thiazolyl)benzimidazole, 25–500 mg./kg.; 2-phenyl benzimidazole, 200–500 mg./kg.; thienyl, pyrryl, and furyl benzimidazoles, 50–250 mg./kg. For the arsenates against tapeworm, the preferred dosages per animal are as follows: aluminum, calcium, copper, iron, and zinc arsenates from 0.25–0.6 gram, tin arsenate from 0.25–0.9 gram, and lead arsenate from 0.1–1.2 grams. In general, the lower amounts are employed for smaller, younger animals, while the larger amounts are used for the larger, more mature animals. Thus, animals weighing around 20–30 kg. or those up to about five months old, may receive up to about 0.6 gram. Those around two years old may receive up to about 1.0 gram while the adults may receive up to about 1.2 grams.

For the most preferred compositions of the invention, i.e. that of 2-(4'-thiazolyl)benzimidazole with copper, tin, lead, or iron arsenates, and wherein the relative amount of each compound is fixed because of the composition being made up for general purpose use, the above dosage ranges represent benzimidazole:arsenate weight ratios of from about 1:0.03–1:2.4 for a 20 kg. animal. It will be appreciated, however, that in practice the amount of arsenate given to a 20 kg. animal, in any composition, should not exceed more than about 0.5 gram because of toxicity problems.

For purposes of convenience of administration, compositions containing fixed amounts of compounds are provided with the user administering as much of the composition as is required based on the desired amount of arsenate to be supplied to the host. Thus, a composition comprising a benzimidazole:arsenate weight ratio of, for example, 1:0.25, desired to be administered to 100 kg. sheep, at a dosage level of 1.0 gram of arsenate per head, results in a concomitant administration of the benzimidazole of 4 grams or 40 mg./kg. of animal body weight. In any event, in accordance with the objects of this invention, the administration of 2-(4'-thiazolyl)benzimidazole with the arsenate allows the use of less arsenate and benzimidazole to achieve the same degree of efficacy as when either is administered alone. These ranges are indicated for therapeutic activity and are highly effective when administered to the host in a single dosage form. Alternatively, the single dosage form may be divided up into smaller forms and administered over a period of several days.

When the compositions are to be solid unit dosage forms as in tablets or boluses, the ingredients other than the anthelmintic compounds may be any other pharmaceutically acceptable vehicles convenient in the preparation of such forms, and preferably materials nutritionally suitable such as starch, lactose, talc, magnesium stearate, vegetable gums, and the like. In such forms, the combined amounts of anthelmintic ingredients conveniently range from about 5 to 80% by weight of the total composition.

When the unit dosage form is to be in the form of a drench, the anthelmintic agents may be mixed with agents which will aid in the subsequent suspending of the anthelmintic ingredients in water, such as bentonite, clays, water soluble starches, cellulose derivatives, gums, surface active agents and the like to form a dry predrench composition, and this predrench composition added to water just before use. In the predrench formulation, in addition to the suspending agent, such ingredients as preservatives, antifoaming compounds, and the like may be employed. Such a dry product may contain over 95% by weight of the anthelmintic compounds, the rest being contributed by the excipients. Preferably, the solid composition contains from 30% to 95% by weight of the anthelmintic compounds. Enough water should be added to the solid product to provide the proper dosage level within a convenient amount of liquid for a single oral dose. A commonly used measure in the field is one fluid ounce of material and thus that one fluid ounce of material should contain enough of the anthelmintic compounds to provide the effective dosage level. Liquid drench formulations containing from about 10 to 30 weight percent of dry ingredients will in general be suitable with the preferred range being from 15 to 50 weight percent.

Where the compositions are intended to be used as feeds, feed supplements or feed premixes, they will be mixed with suitable ingredients of an animal's nutrient ration. The solid orally ingestible carriers normally used for such purposes, such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like are all suitable. The anthelmintic agents are intimately dispersed or admixed throughout the solid inert carrier by methods such as grinding, stirring, milling or tumbling. By selecting proper diluents and by altering the ratio of carrier to active ingredient, compositions of any desired concentration may be prepared. Feed supplement formulations containing from about 5% to about 50% by weight, and preferably from about 10–30% by weight of active ingredient are particularly suitable for addition to feeds. The active compounds are normally dispersed or mixed uniformly in the diluent but in some instances may be adsorbed on the carrier.

These supplements are added to the finished animal feed in an amount adequate to give the final concentration desired for controlling or treating helminthiasis by way of the animal ration. Although the preferred level in feeds will depend on the particular compounds being employed, the anthelmintic agents of this invention are normally fed at levels of 0.05–25% in the feed. Where the treatment is prophylactic, smaller amounts may be employed, suitably of the order of 0.001–3.0 weight percent based on the weight of feed, and may be administered over prolonged periods. One advantageous method of administering the compounds of this invention to animals whose feeds are conveniently pelleted, such as sheep, is to incorporate them directly in the pellets. For instance, the composition of the present invention readily incorporated in nutritionally adequate alfalfa pellets (during the pelleting operation) at levels of about 2 to 110 grams per pound of pellets for therapeutic use, and at lower levels for prophylactic use, and such pellets fed to the worm-infected animals. Alternatively, the anthelmintic compositions may be incorporated in salt licks or salt blocks at any desired concentration (concentrations of 5–25% by weight are conveniently employed). Large animals, such as sheep and cattle then receive the anthelmintics with their salt.

As stated above, the anthelmintic compositions of the present invention are highly effective against a broad spectrum of helminths. Thus, they are able to combat helminthiasis when caused by tapeworms and roundworms, and are effective in ridding the host animal of these two different classes of helminths simultaneously and when carried out in the most preferred aspect contemplated herein, produce a greater degree of helminth control than would be expected from either of the anthelmintic compounds alone.

The following examples are given for purposes of illustration only and are not intended to limit the scope of the present invention.

EXAMPLE 1

Three drench formulations are prepared by suspending the following ingredients in one quart of water.

Formulation A

|  | G. |
|---|---|
| 2-(4'-thiazolyl)benzimidazole | 68.0 |
| Lead arsenate | 34.0 |
| Polysorbate 80 polyoxyethylene (20) sorbitan monooleate (Tween 80; available from Atlas Chem. Co.) | 0.13 |
| Sorbitan monolaurate (Span 20; available from Atlas Chem. Co.) | 0.13 |
| Antifoam AF (emulsion of dimethylpolysiloxane; available from Dow-Corning) | 0.06 |
| Pre-gelatinized starch | 40.7 |
|  | 143.02 |

The total volume of the drench obtained after one quart of water is added is 34 fluid ounces, each fluid ounce containing 2 grams of 2-(4'-thiazolyl)benzimidazole and 1 gram of lead arsenate.

Formulation B

|  | G. |
|---|---|
| 2-(4'-thiazolyl)benzimidazole | 68.0 |
| Polysorbate 80 polyoxyethylene (20) sorbitan monooleate (Tween 80; available from Atlas Chem. Co.) | 0.13 |
| Sorbitan monolaurate (Span 20; available from Atlas Chem. Co.) | 0.13 |
| Antifoam AF (emulsion of dimethylpolysiloxane available from Dow-Corning) | 0.06 |
| Pre-gelatinized starch | 40.7 |
|  | 109.02 |

Formulation B gives 33 ounces of final drench suspension.

Formulation C

Lead arsenate _____ g__ 32
Water q.s. to 1 quart.

Each fluid ounce of well-suspended Formulation C contains 1 gram of lead arsenate.

The administration of the foregoing formulations is as follows: Four groups of ten sheep each are selected on the basis of weight and randomly assigned to four groups. Group I receives Formulation A, Group II receives Formulation B, Group III receives Formulation C, and Group IV remains as an unmedicated control. Examinations for both nematode and cestode eggs are made and counts are performed on feces from each animal prior to the commencement of treatment and by this method determined to be naturally infected with nematodes of the genera Trichostrongylus, Trichuris, Strongyloides, Nematodirus, and Bunostomum, and tapeworms of the genus Moniezia. These counts in the following tables are under the column headed "Pre." After treatment, egg counts are taken at 12 and 30 days thereafter. Animal weights are also determined at the time of treatment and at 30 days. In the following tables $PO_1$ and $PO_2$ mean posttreatment egg counts taken at 12 and 30 days respectively.

The foregoing formulations are administered to the appropriate group at a dosage level corresponding to about 1 gram of lead arsenate per head for Formulations A and C. For Formulation B, the drench is administered at a dosage level of about 50 mg./kg. of animal body weight. The tables below represent the nematode and cestode egg counts prior to treatment and for the periods indicated above following treatment for each of the formulations and for the unmedicated control group. Also presented is a composite of both nematode and cestode egg counts for each group and average reduction of parasites as a result of treatment with the appropriate formulation.

TABLE 1.—2-(4'-THIAZOLYL)BENZIMIDAZOLE, 50 mg./kg PLUS 1 g. LEAD ARSENATE/ANIMAL

[Formulation A]

|  | Trichostrongylids | | | Trichuris | | |
|---|---|---|---|---|---|---|
|  | Pre | $PO_1$ | $PO_2$ | Pre | $PO_1$ | $PO_2$ |
| Animal treated: | | | | | | |
| 5 | 10,000 | 0 | 0 | 0 | 0 | 0 |
| 19 | 9,400 | 0 | 0 | 1,000 | 0 | 0 |
| 11 | 8,600 | 0 | 600 | 100 | 0 | 200 |
| 3 | 3,200 | 0 | 50 | 300 | 100 | 300 |
| 16 | 1,900 | 0 | 50 | 200 | 0 | 0 |
| 30 | 6,000 | 0 | 500 | 0 | 0 | 50 |
| 32 | 4,000 | 0 | 0 | 400 | 0 | 0 |
| 40 | 3,000 | 0 | 0 | 0 | 100 | 0 |
| 24 | 500 | 0 | 0 | 0 | 0 | 100 |
| 35 | 700 | 0 | 0 | 0 | 0 | 0 |
| Total | 47,300 | 0 | 1,200 | 2,000 | 200 | 650 |
| Average | 4,730 | 0 | 120 | 200 | 20 | 65 |

|  | Strongyloides | | | Nematodirus | | |
|---|---|---|---|---|---|---|
|  | Pre | PO₁ | PO₂ | Pre | PO₁ | PO₂ |
| Animal treated: | | | | | | |
| 5 | 200 | 0 | 0 | 200 | 0 | 0 |
| 19 | 200 | 0 | 0 | 0 | 0 | 0 |
| 11 | 0 | 0 | 0 | 0 | 0 | 0 |
| 3 | 600 | 0 | 0 | 0 | 0 | 0 |
| 16 | 200 | 0 | 0 | 0 | 0 | 0 |
| 30 | 700 | 0 | 0 | 0 | 0 | 0 |
| 32 | 0 | 0 | 0 | 0 | 0 | 0 |
| 40 | 0 | 0 | 0 | 0 | 0 | 0 |
| 24 | 0 | 0 | 0 | 0 | 0 | 0 |
| 35 | 0 | 0 | 0 | 0 | 0 | 0 |
| Total | 1,900 | 0 | 0 | 200 | 0 | 0 |
| Average | 190 | 0 | 0 | 20 | 0 | 0 |

|  | Bunostomum | | | Cooperia | | |
|---|---|---|---|---|---|---|
|  | Pre | PO₁ | PO₂ | Pre | PO₁ | PO₂ |
| Animal treated: | | | | | | |
| 5 | 300 | 0 | 0 | 0 | 0 | 0 |
| 19 | 600 | 0 | 0 | 0 | 0 | 0 |
| 11 | 1,400 | 0 | 100 | 0 | 0 | 0 |
| 3 | 1,200 | 0 | 0 | 0 | 0 | 0 |
| 16 | 100 | 0 | 0 | 0 | 0 | 0 |
| 30 | 700 | 0 | 50 | 0 | 0 | 0 |
| 32 | 600 | 0 | 0 | 0 | 0 | 0 |
| 40 | 0 | 0 | 0 | 0 | 0 | 0 |
| 24 | 0 | 0 | 0 | 0 | 0 | 0 |
| 35 | 0 | 0 | 0 | 0 | 0 | 0 |
| Total | 4,900 | 0 | 150 | 0 | 0 | 0 |
| Average | 490 | 0 | 15 | 0 | 0 | 0 |

|  | Moniezia | | | Eimeria | | |
|---|---|---|---|---|---|---|
|  | Pre | PO₁ | PO₂ | Pre | PO₁ | PO₂ |
| Animal treated: | | | | | | |
| 5 | 0 | 0 | 200 | X | X | X |
| 19 | 100 | 100 | 0 | X | X | XX |
| 11 | 1,400 | 0 | 0 | X | 0 | X |
| 3 | 0 | 0 | 0 | X | X | 0 |
| 16 | 0 | 0 | 0 | 0 | X | X |
| 30 | 4,600 | 0 | 100 | X | X | X |
| 32 | 400 | 0 | 0 | 0 | X | X |
| 40 | 1,800 | 0 | 100 | 0 | X | X |
| 24 | 0 | 0 | 0 | X | X | 0 |
| 35 | 0 | 0 | 0 | X | 0 | X |
| Total | 8,300 | 100 | 400 | 7X | 8X | 9X |
| Average | 830 | 10 | 40 | .7X | .8X | .9X |

|  | Weight | | |
|---|---|---|---|
|  | Pre | PO₁ | PO₂ |
| Animal treated: | | | |
| 5 | 22 | -------- | 21.5 |
| 19 | 22 | -------- | 21 |
| 11 | 25 | -------- | 26 |
| 3 | 27 | -------- | 25 |
| 16 | 30 | -------- | 30 |
| 30 | 30 | -------- | 28 |
| 32 | 31 | -------- | 29 |
| 40 | 32 | -------- | 32 |
| 24 | 32 | -------- | 30 |
| 35 | 38 | -------- | 33 |
| Total | 289 | -------- | 275.5 |
| Average | 28.9 | -------- | 27.5 |

N.D., not done.
1X, light infection.
2X, moderate infection.
3X, heavy infection.

TABLE 2.—2-(4'-THIAZOLYL)BENZIMIDAZOLE, 50 mg./kg.
[Formulation B]

|  | Trichostrongylids | | | Trichuris | | |
|---|---|---|---|---|---|---|
|  | Pre | PO₁ | PO₂ | Pre | PO₁ | PO₂ |
| Animal treated: | | | | | | |
| 29 | 8,000 | 0 | 100 | 100 | 0 | 200 |
| 21 | 11,900 | 0 | 1,000 | 0 | 0 | 0 |
| 31 | 900 | 0 | 0 | 200 | 100 | 0 |
| 12 | 2,700 | 100 | N.D. | 0 | 0 | N.D. |
| 18 | 2,200 | 0 | 1,000 | 0 | 0 | 0 |
| 27 | 1,400 | 0 | 0 | 100 | 100 | 100 |
| 1 | 13,000 | 0 | 0 | 300 | 100 | 100 |
| 14 | 1,000 | 0 | 0 | 0 | 0 | 0 |
| 6 | 3,400 | 0 | 100 | 150 | 0 | 100 |
| 25 | 600 | 0 | 0 | 0 | 0 | 100 |
| Total | 45,100 | 100 | 2,200 | 750 | 300 | 600 |
| Average | 4,510 | 10 | 244 | 75 | 30 | 67 |

|  | Strongyloides | | | Nematodirus | | |
|---|---|---|---|---|---|---|
|  | Pre | PO₁ | PO₂ | Pre | PO₁ | PO₂ |
| Animal treated: | | | | | | |
| 29 | 200 | 0 | 0 | 400 | 0 | 0 |
| 21 | 700 | 0 | 0 | 0 | 0 | 0 |
| 31 | 0 | 0 | 0 | 0 | 0 | 0 |
| 12 | 300 | 0 | N.D. | 0 | 0 | N.D. |
| 18 | 600 | 0 | 100 | 0 | 0 | 0 |
| 27 | 600 | 0 | 0 | 0 | 0 | 0 |
| 1 | 500 | 0 | 0 | 0 | 0 | 0 |
| 14 | 0 | 0 | 0 | 0 | 0 | 0 |
| 6 | 400 | 0 | 0 | 0 | 0 | 0 |
| 25 | 0 | 0 | 0 | 0 | 0 | 0 |
| Total | 3,300 | 0 | 100 | 400 | 0 | 0 |
| Average | 330 | 0 | 11 | 40 | 0 | 0 |

|  | Bunostomum | | | Cooperia | | |
|---|---|---|---|---|---|---|
|  | Pre | PO₁ | PO₂ | Pre | PO₁ | PO₂ |
| Animal treated: | | | | | | |
| 29 | 400 | 0 | 0 | 0 | 0 | 0 |
| 21 | 500 | 0 | 0 | 0 | 0 | 0 |
| 31 | 0 | 0 | 0 | 0 | 0 | 0 |
| 12 | 2,000 | 0 | N.D. | 0 | 0 | N.D. |
| 18 | 300 | 0 | 100 | 0 | 0 | 0 |
| 27 | 200 | 0 | 0 | 0 | 0 | 0 |
| 1 | 700 | 0 | 0 | 0 | 0 | 0 |
| 14 | 200 | 0 | 0 | 0 | 0 | 0 |
| 6 | 0 | 0 | 0 | 0 | 0 | 0 |
| 25 | 0 | 0 | 0 | 0 | 0 | 0 |
| Total | 4,300 | 0 | 100 | 0 | 0 | 0 |
| Average | 430 | 0 | 11 | 0 | 0 | 0 |

|  | Moniezia | | | Eimeria | | |
|---|---|---|---|---|---|---|
|  | Pre | PO₁ | PO₂ | Pre | PO₁ | PO₂ |
| Animal treated: | | | | | | |
| 29 | 100 | 700 | 300 | 0 | X | X |
| 21 | 0 | 2,300 | 800 | X | X | X |
| 31 | 400 | 600 | 100 | 0 | 0 | 0 |
| 12 | 0 | 0 | N.D. | XX | XXX | N.D. |
| 18 | 2,800 | 2,200 | 1,700 | X | X | X |
| 27 | 3,000 | 200 | 400 | X | X | X |
| 1 | 0 | 200 | 0 | X | X | X |
| 14 | 0 | 0 | 1,000 | 0 | 0 | 0 |
| 6 | 500 | 250 | 400 | 0 | X | X |
| 25 | 0 | 0 | 0 | X | XX | XX |
| Total | 6,800 | 6,450 | 4,700 | 7X | 11X | 8X |
| Average | 680 | 645 | 522 | .7X | 1.1X | 0.9X |

|  | Weight | | |
|---|---|---|---|
|  | Pre | PO₁ | PO₂ |
| Animal treated: | | | |
| 29 | 24 | -------- | 23 |
| 21 | 25 | -------- | 25 |
| 31 | 26 | -------- | 25 |
| 12 | 27 | -------- | N.D. |
| 18 | 29 | -------- | 27 |
| 27 | 29 | -------- | 28.5 |
| 1 | 30 | -------- | 29.5 |
| 14 | 30 | -------- | 26.5 |
| 6 | 33 | -------- | 29.5 |
| 25 | 35 | -------- | 34.5 |
| Total | 288 | -------- | 248.5 |
| Average | 28.8 | -------- | 27.6 |

N.D., not done.
1X, light infection.
2X, moderate infection.
3X, heavy infection.

TABLE 3.—LEAD ARSENATE, 1 g./ANIMAL
[Formulation C]

| Animal treated: | Trichostrongylids | | | Trichuris | | |
|---|---|---|---|---|---|---|
| | Pre | PO₁ | PO₂ | Pre | PO₁ | PO₂ |
| 17 | 1,800 | 1,600 | 2,000 | 0 | 0 | 100 |
| 21 | 12,000 | 13,000 | 12,600 | 0 | 0 | 0 |
| 28 | 8,600 | 8,400 | 7,700 | 600 | 600 | 1,000 |
| 34 | 7,000 | 7,600 | Died | 300 | 350 | Died |
| 10 | 13,000 | 9,200 | 9,500 | 800 | 500 | 700 |
| 8 | 1,400 | 1,600 | N.D. | 0 | 100 | N.D. |
| 38 | 1,000 | N.D. | 1,600 | 0 | N.D. | 0 |
| 13 | 1,700 | 1,600 | 1,400 | 0 | 0 | 0 |
| 33 | 300 | 1,200 | 2,200 | 0 | 0 | 0 |
| 37 | 2,000 | 2,200 | 2,200 | 100 | 100 | 0 |
| Total | 48,800 | 46,400 | 39,200 | 1,800 | 1,650 | 1,800 |
| Average | 4,880 | 5,156 | 4,900 | 180 | 183 | 225 |

| Animal treated: | Strongyloides | | | Nematodirus | | |
|---|---|---|---|---|---|---|
| | Pre | PO₁ | PO₂ | Pre | PO₁ | PO₂ |
| 17 | 300 | 350 | 300 | 0 | 0 | 0 |
| 21 | 200 | 250 | 300 | 200 | 150 | 150 |
| 28 | 300 | 450 | 650 | 200 | 300 | 350 |
| 34 | 0 | 100 | Died | 0 | 0 | Died |
| 10 | 300 | 300 | 600 | 0 | 0 | 0 |
| 8 | 200 | 300 | N.D. | 0 | 0 | N.D. |
| 38 | 0 | N.D. | 400 | 100 | N.D. | 100 |
| 13 | 600 | 700 | 700 | 100 | 0 | 100 |
| 33 | 200 | 200 | 100 | 0 | 0 | 0 |
| 37 | 0 | 0 | 0 | 0 | 0 | 0 |
| Total | 2,100 | 2,650 | 3,050 | 600 | 450 | 700 |
| Average | 210 | 294 | 381 | 60 | 50 | 88 |

| Animal treated: | Bunostomum | | | Cooperia | | |
|---|---|---|---|---|---|---|
| | Pre | PO₁ | PO₂ | Pre | PO₁ | PO₂ |
| 17 | 0 | 100 | 500 | 0 | 0 | 0 |
| 21 | 1,400 | 1,600 | 1,300 | 0 | 0 | 0 |
| 28 | 400 | 600 | 600 | 0 | 0 | 0 |
| 34 | 600 | 300 | Died | 0 | 0 | Died |
| 10 | 800 | 650 | 750 | 0 | 0 | 0 |
| 8 | 200 | 500 | N.D. | 0 | 0 | N.D. |
| 38 | 300 | N.D. | 700 | 0 | N.D. | 0 |
| 13 | 500 | 200 | 700 | 0 | 0 | 0 |
| 33 | 100 | 200 | 500 | 0 | 0 | 0 |
| 37 | 500 | 350 | 700 | 0 | 0 | 0 |
| Total | 4,800 | 4,500 | 5,750 | 0 | 0 | 0 |
| Average | 480 | 500 | 719 | 0 | 0 | 0 |

| Animal treated: | Moniezia | | | Eimeria | | |
|---|---|---|---|---|---|---|
| | Pre | PO₁ | PO₂ | Pre | PO₁ | PO₂ |
| 17 | 0 | 0 | 0 | X | 0 | XX |
| 21 | 0 | 0 | 0 | 0 | 0 | 0 |
| 28 | 0 | 0 | 0 | 0 | X | X |
| 34 | 0 | 0 | Died | X | X | Died |
| 10 | 0 | 0 | 0 | X | X | X |
| 8 | 2,500 | 300 | N.D. | X | X | N.D. |
| 38 | 0 | N.D. | 0 | 0 | N.D. | X |
| 13 | 1,000 | 0 | 100 | X | X | X |
| 33 | 0 | 0 | 500 | 0 | X | 0 |
| 37 | 0 | 0 | 600 | X | X | X |
| Total | 3,500 | 300 | 1,200 | 6X | 7X | 7X |
| Average | 350 | 33 | 150 | .6X | .8X | .9X |

| Animal treated: | Weight | | |
|---|---|---|---|
| | Pre | PO₁ | PO₂ |
| 17 | 22 | | 20 |
| 21 | 22 | | 21.5 |
| 28 | 23 | | 21.5 |
| 34 | 28 | | Died |
| 10 | 29 | | 28 |
| 8 | 31 | | N.D. |
| 38 | 32 | | 30 |
| 13 | 33 | | 29 |
| 33 | 33 | | 23 |
| 37 | 36 | | 33 |
| Total | 289 | | 206.0 |
| Average | 28.9 | | 25.7 |

N.D., not done.
1X, light infection.
2X, moderate infection.
3X, heavy infection.

TABLE 4.—UNMEDICATED CONTROLS

| Animal treated: | Trichostrongylids | | | Trichuris | | |
|---|---|---|---|---|---|---|
| | Pre | PO₁ | PO₂ | Pre | PO₁ | PO₂ |
| 7 | 2,200 | 2,500 | 2,900 | 300 | 350 | 0 |
| 9 | 4,000 | 6,200 | 7,700 | 0 | 200 | 0 |
| 4 | 6,700 | 6,800 | 4,800 | 300 | 250 | 100 |
| 23 | 12,800 | 11,700 | 18,000 | 200 | 350 | 250 |
| 26 | 3,400 | 3,200 | 2,100 | 0 | 0 | 100 |
| 36 | 1,200 | 1,400 | 1,500 | 0 | 0 | 0 |
| 15 | 2,600 | 3,900 | 2,900 | 0 | 200 | 200 |
| 39 | 1,000 | 1,200 | 1,100 | 0 | 0 | 0 |
| 22 | 2,700 | 3,800 | 6,200 | 1,200 | 1,000 | 500 |
| 20 | 2,200 | 2,300 | 1,800 | 800 | 1,000 | 650 |
| Total | 38,800 | 43,000 | 49,000 | 2,800 | 3,350 | 1,800 |
| Average | 3,880 | 4,300 | 4,900 | 280 | 335 | 180 |

| Animal treated: | Strongyloides | | | Nematodirus | | |
|---|---|---|---|---|---|---|
| | Pre | PO₁ | PO₂ | Pre | PO₁ | PO₂ |
| 7 | 300 | 300 | 200 | 0 | 0 | 0 |
| 9 | 0 | 0 | 300 | 0 | 100 | 200 |
| 4 | 0 | 0 | 100 | 0 | 0 | 0 |
| 23 | 600 | 600 | 300 | 200 | 300 | 150 |
| 26 | 700 | 750 | 250 | 100 | 100 | 100 |
| 36 | 700 | 1,000 | 900 | 300 | 400 | 400 |
| 15 | 300 | 300 | 250 | 0 | 0 | 0 |
| 39 | 0 | 0 | 900 | 0 | 0 | 0 |
| 22 | 0 | 100 | 800 | 0 | 0 | 0 |
| 20 | 100 | 200 | 200 | 0 | 0 | 0 |
| Total | 2,700 | 4,050 | 3,400 | 600 | 900 | 850 |
| Average | 270 | 405 | 340 | 60 | 90 | 85 |

| Animal treated: | Bunostomum | | | Cooperia | | |
|---|---|---|---|---|---|---|
| | Pre | PO₁ | PO₂ | Pre | PO₁ | PO₂ |
| 7 | 500 | 650 | 550 | 0 | 0 | 100 |
| 9 | 400 | 300 | 800 | 0 | 0 | 0 |
| 4 | 500 | 450 | 600 | 0 | 0 | 0 |
| 23 | 900 | 850 | 650 | 0 | 0 | 0 |
| 26 | 500 | 650 | 400 | 0 | 0 | 0 |
| 36 | 600 | 650 | 400 | 0 | 0 | 0 |
| 15 | 200 | 300 | 250 | 0 | 0 | 0 |
| 39 | 500 | 500 | 600 | 0 | 0 | 0 |
| 22 | 100 | 400 | 400 | 0 | 0 | 0 |
| 20 | 600 | 450 | 500 | 0 | 0 | 0 |
| Total | 4,800 | 5,200 | 5,150 | 0 | 0 | 100 |
| Average | 480 | 520 | 515 | 0 | 0 | 10 |

| Animal treated: | Moniezia | | | Eimeria | | |
|---|---|---|---|---|---|---|
| | Pre | PO₁ | PO₂ | Pre | PO₁ | PO₂ |
| 7 | 0 | 0 | 0 | 0 | 0 | X |
| 9 | 400 | 300 | 800 | 0 | X | X |
| 4 | 6,000 | 3,500 | 3,000 | X | X | XXX |
| 23 | 10,500 | 10,000 | 6,000 | 0 | 0 | X |
| 26 | 0 | 0 | 0 | X | X | XX |
| 36 | 0 | 0 | 0 | X | X | X |
| 15 | 0 | 0 | 0 | X | XX | X |
| 39 | 0 | 0 | 100 | X | XX | X |
| 22 | 800 | 850 | 650 | 0 | X | X |
| 20 | 400 | 400 | 900 | X | XX | X |
| Total | 18,100 | 15,050 | 11,450 | 6X | 11X | 13X |
| Average | 1,810 | 1,505 | 1,145 | .6X | 1.1X | 1.3X |

| Animal treated: | Weight | | |
|---|---|---|---|
| | Pre | PO₁ | PO₂ |
| 7 | 21 | | 20 |
| 9 | 23 | | 21 |
| 4 | 26 | | 22 |
| 23 | 26 | | 25 |
| 26 | 26 | | 24 |
| 36 | 28 | | 25 |
| 15 | 33 | | 28 |
| 39 | 35 | | 31.5 |
| 22 | 36 | | 31 |
| 20 | 40 | | 36.5 |
| Total | 294 | | 264.0 |
| Average | 29.4 | | 26.4 |

N.D., Not done.
1X, Light infection.
2X, Moderate infection.
3X, Heavy infection.

SUMMARY OF RESULTS

TABLE 1-S.—2-(4'-THIAZOLYL)BENZIMIDAZOLE, 50 mg./kg. PLUS 1 g. LEAD ARSENATE/ANIMAL

[Formulation A]

|  | Pre | Percent | PO$_1$ | Percent | PO$_2$ | Percent |
|---|---|---|---|---|---|---|
| Trichostrongylids | 4,730 | 100 | 0 |  | 120 | 2.5 |
| Trichuris | 200 | 100 | 20 | 10.0 | 65 | 33.0 |
| Strongyloides | 190 | 100 | 0 |  | 0 |  |
| Nematodirus | 20 | 100 | 0 |  | 0 |  |
| Bunostomum | 490 | 100 | 0 |  | 15 | 3.0 |
| Cooperia | 0 | 100 | 0 |  | 0 |  |
| Total | 5,630 | 100 | 20 | .36 | 200 | 3.6 |
| Moniezia | 830 | 100 | 10 | 1.2 | 40 | 4.8 |
| Weight | 28.9 | 100 |  |  | 27.5 | 95.0 |

TABLE 2-S.—2-(4'-THIAZOLYL)BENZIMIDAZOLE, 50 mg./kg.

[Formulation B]

|  | Pre | Percent | PO$_1$ | Percent | PO$_2$ | Percent |
|---|---|---|---|---|---|---|
| Trichostrongylids | 4,510 | 100 | 10 | 0.2 | 244 | 5.4 |
| Trichuris | 75 | 100 | 30 | 40 | 67 | 89 |
| Strongyloides | 330 | 100 | 0 |  | 11 | 3.3 |
| Nematodirus | 40 | 100 | 0 |  | 0 |  |
| Bunostomum | 430 | 100 | 0 |  | 11 | 2.6 |
| Cooperia | 0 | 100 | 0 |  | 0 |  |
| Total | 5,385 | 100 | 40 | .7 | 333 | 6 |
| Moniezia | 680 | 100 | 645 | 95 | 522 | 77 |
| Weight | 28.8 | 100 |  |  | 27.6 | 95.9 |

TABLE 3-S.—LEAD ARSENATE, 1 g./ANIMAL

[Formulation C]

|  | Pre | Percent | PO$_1$ | Percent | PO$_2$ | Percent |
|---|---|---|---|---|---|---|
| Trichostrongylids | 4,880 | 100 | 5,156 | 106 | 4,990 | 100.4 |
| Trichuris | 180 | 100 | 183 | 101.7 | 225 | 125 |
| Strongyloides | 210 | 100 | 294 | 140 | 381 | 181 |
| Nematodirus | 60 | 100 | 50 | 83 | 88 | 147 |
| Bunostomum | 480 | 100 | 500 | 104 | 719 | 150 |
| Cooperia | 0 | 100 | 0 |  | 0 |  |
| Total | 5,810 | 100 | 6,183 | 106 | 6,403 | 108 |
| Moniezia | 350 | 100 | 33 | 9.4 | 150 | 43 |
| Weight | 28.9 | 100 |  |  | 25.7 | 89 |

TABLE 4-S.—UNMEDICATED CONTROLS

|  | Pre | Percent | PO$_1$ | Percent | PO$_2$ | Percent |
|---|---|---|---|---|---|---|
| Trichostrongylids | 3,800 | 100 | 4,300 | 111 | 4,900 | 126 |
| Trichuris | 280 | 100 | 335 | 120 | 180 | 64 |
| Strongyloides | 270 | 100 | 405 | 150 | 340 | 126 |
| Nematodirus | 60 | 100 | 90 | 150 | 85 | 142 |
| Bunostomum | 480 | 100 | 520 | 108 | 515 | 107 |
| Cooperia | 0 | 100 | 0 |  | 10 | 100 |
| Total | 4,970 | 100 | 5,650 | 114 | 6,030 | 121 |
| Moniezia | 1,810 | 100 | 1,505 | 83 | 1,145 | 63 |
| Weight | 29.4 | 100 |  |  | 26.4 | 90 |

It will be apparent from Tables 1-S, 2-S, 3-S, and 4-S, the summary of the results of testing, that the combination of 2-(4'-thiazolyl)benzimidazole plus lead arsenate removed an appreciably larger number of tapeworms, as measured by percent reduction in egg count, than does either compound alone. For example, Table 1-S shows an average Moniezia pretreatment egg count of 830 EPG which, 12 days after treatment with Formulation A, is reduced to 10 EPG, giving a 98.8% reduction. On the other hand, when the formulation comprising 2-(4'-thiazolyl)benzimidazole alone is employed, the Moniezia egg count prior to treatment is 680 EPG which, 12 days after treatment with Formulation B, is reduced only to 645 or a 5% reduction. On the other hand, when lead arsenate alone is employed with Formulation C, as is apparent from Table 3-S, the average Moniezia egg count prior to treatment of 350 EPG is reduced to 33 twelve days after treatment or a percent reduction of 90.6. Thus, it is apparent that Formulation A, containing both lead arsenate and 2-(4'-thiazolyl)benzimidazole, effects a larger percent reduction than either of the two active ingredients administered alone produce.

Moreover, the effect that 2-(4'-thiazolyl)benzimidazole has on nematodes in the presence of lead arsenate is likewise enhanced over the effect that the benzimidazole has when administered alone. This is apparent from a comparison of Tables 1-S and 2-S where, although the effect is not evident in nematodes other than Trichuris, because of the extreme efficacy of 2-(4'-thiazolyl)benzimidazole against the other nematodes, the difference is apparent when the efficacy against Trichuris is compared. Thus, when 2-(4'-thiazolyl)benzimidazole is administered alone, an average Trichuris egg count prior to treatment of 75 EPG is reduced to 30 EPG 12 days following treatment for a 60% reduction, whereas from Table 1-S when the benzimidazole is administered together with the lead arsenate, an average pretreatment Trichuris egg count of 200 EPG is reduced to 20 EPG 12 days after treatment for a 90% reduction. It will be noted that in the unmedicated controls the Trichuris infestation increases by 20% over the twelve-day measuring period.

The Eimeria data are not summarized in Tables 1-S to 4-S since the compositions showed no efficacy against this parasite.

Similar results are obtained when the lead arsenate in the foregoing example is replaced by the arsenates of aluminum, calcium, cobalt, copper, tin, iron, or zinc. Similarly, when the 2-(4'-thiazolyl)benzimidazole in the foregoing example is replaced by 68.0 grams of 2-(2'-thiazolyl)benzimidazole, 136 grams of 2-(2'-furyl)benzimidazole, 136 grams of 2-(2'-pyrryl)benzimidazole, 136 grams of 2-(3'-thienyl)benzimidazole, or 420 grams of 2-phenyl benzimidazole, the compositions obtained are likewise effective in the removal of the parasites.

EXAMPLE 2

(A) Drench suspension

A drench suspension is prepared by suspending 150 grams of the following composition in a quart of water.

|  | G. |
|---|---|
| 2-(4'-thiazolyl)benzimidazole | 149.6 |
| Ferric arsenate | 58.9 |
| Powdered premix from D below | 89.8 |
| Lactose | 31.7 |
| Total | 330.0 |

This drench makes a total of 34 fluid ounces, and each ounce contains 2.0 grams of 2-(4'-thiazolyl)benzimidazole and 0.8 gram of ferric arsenate.

(B) Ferric arsenate suspension

A ferric arsenate suspension is prepared by suspending 150 grams of the following composition in one quart of water.

|  | G. |
|---|---|
| Ferric arsenate | 74.8 |
| Powdered premix from D below | 90.2 |
| Lactose | 165.0 |
| Total | 330.0 |

This suspension makes a total of 34 fluid ounces and each ounce contains 1.0 grams of ferric arsenate.

(C) 2-(4'-thiazolyl)benzimidazole drench formulation

A 2-(4'-thiazolyl)benzimidazole suspension is prepared by suspending the following composition in one quart of water.

|  | G. |
|---|---|
| 2-(4'-thiazolyl)benzimidazole | 68.0 |
| Polysorbate 80 polyoxyethylene (20) sorbitan monooleate (Tween 80; available from Atlas Chem. Co.) | 0.13 |
| Sorbitan monolaurate (Span 20; available from Atlas Chem. Co.) | 0.13 |
| Antifoam AF (emulsion of dimethylpolysiloxane available from Dow-Corning) | 0.06 |
| Pre-gelatinized starch | 40.7 |
| Total | 109.02 |

The formulation gives 33 ounces of final drench suspension.

(D) Powdered premix

A premix is prepared by mixing the following ingredients.

|  | G. |
|---|---|
| Polysorbate 80 polyoxyethylene (20) sorbitan monooleate (Tween 80; available from Atlas Chem. Co.) | 2.5 |
| Sorbitan monolaurate (Span 20; available from Atlas Chem. Co.) | 2.5 |
| Antifoam AF (emulsion of dimethylpolysiloxane available from Dow-Corning) | 0.6 |
| Pre-gelatinized starch | 814.4 |
| Total | 820.0 |

The drench suspension A is modified by the addition of 0.2 gram of ferric arsenate per ounce equivalent to the ferric arsenate suspension B thereby producing a 2:1 ratio of 2-(4'-thiazolyl)benzimidazole to ferric arsenate.

The administration of the above modified drench is as follows. A group of previously uninfected young sheep are experimentally infected with a resistant strain of *Haemonchus contortus* which was isolated near Casa Grande, Ariz. The infections become patent in five weeks and the sheep are divided into six treatment groups and the modified drench, arsenate drench, and benzimidazole drench are administered. On the third day after administration of the drenches, the sheep are killed, and the total number of Haemonchus (all stages) remaining in the abomasa are determined. Table I below summarizes the data obtained.

TABLE I

| Treatment | No. Sheep | Dosage, mg./kg. | Mean No Haemonchus after treatment |
|---|---|---|---|
| Ferric arsenate suspension from B above | 3 | 33.3 | 1,200 |
| 2-(4'-thiazolyl)benzimidazole suspension from C above | 3 | 66.7 | 1,100 |
| 2-(4'-thiazolyl)benzimidazole suspension 33.3 mg./kg. plus ferric arsenate suspension, 16.7 mg./kg. from modified A above | 3 | 50.0 | 650 |
| 2-(4'-thiazolyl)benzimidazole suspension 44.4 mg./kg. plus ferric arsenate suspension, 22.2 mg./kg. from modified A above | 3 | 66.6 | 715 |
| 2-(4'-thiazolyl)benzimidazole suspension 55.5 mg./kg. plus ferric arsenate suspension, 27.8 mg./kg. from modified A above | 3 | 83.3 | 25 |

It can be seen from Table I above that the combination of ferric arsenate and 2-(4'-thiazolyl)benzimidazole produce considerably better results than either of the components taken individually.

EXAMPLE 3

A drench suspension is prepared by suspending the following ingredients in an amount of water such that the total volume is one liter.

| 2-(4'-thiazolyl)benzimidazole | g | 38 |
|---|---|---|
| Lead arsenate | g | 16.7 |
| Benzalkonium chloride (12.8% aqueous solution) | ml | 20 |
| Antifoam AF (see Example 1) | g | 2 |
| Hydroxyethyl cellulose (WP 4400 Union Carbide Chemical Company) | g | 12.5 |
| Water q.s. to 1 liter. | | |

Each 30 ml. of the above drench contains 1.14 grams of 2-(4'-thiazolyl)benzimidazole and 0.5 gram of lead arsenate. The administration of the drench is as follows. A group of 31 lambs naturally infected with roundworm and tapeworm are treated with the drench. Fecal samples obtained from 15 randomly selected lambs in this group prior to treatment contained eggs and proglottids of Moniezia species, without exception. Seven days after treatment with the drench, again 15 randomly selected lambs are examined for the presence of eggs or proglottids in fecal samples. Table I below summarizes the data obtained.

TABLE I

| Pretreatment | | | Post-treatment (7 days) | |
| --- | --- | --- | --- | --- |
| Eggs/gram Roundworm | Tapeworm [1] | Animal No. | Eggs/gram Roundworm | Tapeworm [1] |
| 325 | 4+ | 1 | 34 [2] | 0 |
| 675 | 1+ | 2 | 72 | 0 |
| 1,400 | 2+ | 3 | 110 | 0 |
| 8,975 | 2+ | 4 | 142 | 0 |
| 6,750 | 1+ | 5 | 138 | 0 |
| 8,200 | 1+ | 6 | 4 | 0 |
| 625 | 1+ | 7 | 156 | 0 |
| 2,550 | 1+ | 8 | 38 | 0 |
| 1,375 | 1+ | 9 | 38 | 0 |
| 1,450 | 1+ | 10 | 228 | 0 |
| 625 | 1+ | 11 | 86 | 0 |
| 1,350 | 4+ | 12 | 32 | 0 |
| 4,700 | 1+ | 13 | 356 | 0 |
| 550 | 1+ | 14 | 310 | 0 |
| 1,250 | 4+ | 15 | 8 | 0 |
| Mean 2,720 | | | 117 | |

[1] 4+=heavy. 2+=moderate. 1+=light. 0=none.
[2] Over 90% of post-treatment eggs are Trichuris ovis.

It will be observed from the table that there was no evidence of tapeworm eggs or proglottids in the post-treatment fecal examination, whereas the pretreatment examination showed light to heavy infections in the animals. Similarly, a marked reduction in the nematode egg count is observed after treatment with the drench, thus indicating outstanding efficacy for the compositions. In addition, no untoward side effects are observed in the sheep at the level of drug concentration given.

Example 4

In order to show the wide range of effectiveness of the composition of the present invention, the modified drench of Example 2 is administered to sheep infected with seven genera of parasites and various immature worms. Each group consists of five sheep. The sheep are killed seven days after dosage, and worm counts are made on 10% aliquots of the total contents of abomasum and of the entire intestines of each sheep. Worm counts are analyzed biometrically after transforming to the negative binomial. The results for each genera are summarized in Table I below.

TABLE I

| Parasite Genus | With No Treatment | With Treatment [1] |
| --- | --- | --- |
| Haemonchus | 1,310 | 1 |
| Ostertagia | 1,800 | <1 |
| Trichostrongylus | 1,500 | <1 |
| Cooperia | 18 | <1 |
| Nematodirus | 29 | 1 |
| Oesophagostomum | 11 | <1 |
| Chabertia | 12 | <1 |
| Immature worms (predominantly) Ostertagia) | 240 | 12 |

[1] Treatment with 44 mg./kg. modified suspension A above containing 29.3 mg./kg. 2-(4'-thiazolyl)benzimidazole suspension and 14.7 mg./kg. ferric arsenate suspension.

Example 5

A bolus containing 2-phenyl benzimidazole and lead arsenate suitable for oral administration to domesticated animals of about 50 pounds of body weight is prepared from the following ingredients:

|  | G. |
| --- | --- |
| 2-phenyl benzimidazole | 6.6 |
| Lead arsenate | 0.5 |
| Dicalcium phosphate | 3.0 |
| Starch | 0.535 |
| Guar gum | 0.15 |
| Talc | 0.14 |
| Magnesium stearate | 0.04 |

The dicalcium phosphate is thoroughly mixed with the 2-phenyl benzimidazole and the lead arsenate and the mixture reduced to a particle size finer than 60 mesh. To the mixture is added 0.330 gram of starch in the form of an aqueous starch paste and the resulting mixture granulated in the usual manner. The granules are then passed through a No. 10 mesh screen and dried at 110°–130° F. for about 18 hours, and the dried material then passed through a No. 16 mesh screen. The guar gum and the balance of the starch are added and the mixture thoroughly blended. The remainder of the ingredients are then added and the whole thoroughly mixed and compressed.

Example 6

A tablet having the following composition:

| 2-(4'-thiazolyl)benzimidazole | g | 1.14 |
| --- | --- | --- |
| Lead arsenate | mg | 500 |
| Dicalcium phosphate | mg | 150 |
| Starch | mg | 125 |
| Guar gum (60 mesh) | mg | 17 |
| Talc (60 mesh) | mg | 14 |
| Magnesium stearate (60 mesh) | mg | 5 | is prepared in the following manner:

The dicalcium phosphate, 2-(4'-thiazolyl)benzimidazole, lead arsenate, and 50 mg. of starch are thoroughly mixed and the mixture reduced to a particle size finer than 60 mesh. 45 mg. of starch in the form of an aqueous starch paste is added to the mixture and the whole granulated in the usual manner. The granules are then passed through a No. 10 mesh screen and dried at 110°–130° F. for about 8 hours. The dried material is then passed through a No. 16 mesh screen. The guar gum and the balance of the starch are added and the mixture thoroughly blended. The remainder of the ingredients are then added and the mass mixed and compressed.

We claim:

1. The method of treating helminthiasis in animals infected with helminths of the genera Trichuris, Moniezia and Haemonchus which comprises orally administering to an animal an anthelmintically effective amount of a compound selected from the group consisting of 2-(4'-thiazolyl)benzimidazole and nontoxic acid addition salts thereof and a metal arsenate selected from the group consisting of lead arsenate and ferric arsenate in a 2 to 1 ratio of benzimidazole to metal arsenate.

2. A composition for treating animals infected with helminths of the genera Trichuris, Moniezia and Haemonchus comprising an anthelmintically effective amount of a compound selected from the group consisting of 2-(4'-thiazolyl)benzimidazole and nontoxic acid addition salts thereof and a metal arsenate selected from the group consisting of lead arsenate and ferric arsenate, the ratio of benzimidazole to metal arsenate being 2 to 1.

References Cited

UNITED STATES PATENTS

| 3,162,574 | 12/1964 | Forsyth | 167—53 |
| --- | --- | --- | --- |
| 3,080,282 | 3/1963 | Shunk | 167—53 |
| 3,017,415 | 1/1962 | Sarett et al. | 167—53 |
| 3,138,607 | 6/1964 | Brown | 167—53 |
| 3,192,108 | 6/1965 | Brown et al. | 167—53 |

FOREIGN PATENTS

| 121,538 | 10/1958 | U.S.S.R. |
| --- | --- | --- |
| 118,003 | 7/1958 | U.S.S.R. |

OTHER REFERENCES

Foster, the Yearbook of Agriculture for 1956, pp. 75–87 (1956).

FRANK CACCIAPAGLIA, Jr., Primary Examiner

U.S. Cl. X.R.

424—138, 147, 270